(12) United States Patent
Peck et al.

(10) Patent No.: US 7,549,292 B2
(45) Date of Patent: Jun. 23, 2009

(54) METHOD OF CONTROLLING BYPASS AIR SPLIT TO GAS TURBINE COMBUSTOR

(75) Inventors: Amanda Rose Peck, Greenville, SC (US); Jonathan Carl Thatcher, Liberty, SC (US); Krishna Venkataraman, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 571 days.

(21) Appl. No.: 11/163,025

(22) Filed: Oct. 3, 2005

(65) Prior Publication Data

US 2007/0074516 A1    Apr. 5, 2007

(51) Int. Cl.
*F02C 9/18* (2006.01)
(52) U.S. Cl. .......................................... 60/773; 60/794
(58) Field of Classification Search ............... 60/39.23, 60/39.281, 772, 773, 792, 794
See application file for complete search history.

(56) References Cited

U.S. PATENT DOCUMENTS

| | | | | |
|---|---|---|---|---|
| 3,750,465 A | * | 8/1973 | Howell et al. ............ | 73/112.03 |
| 3,902,315 A | * | 9/1975 | Martin ..................... | 60/39.091 |
| 5,157,918 A | * | 10/1992 | Maulat ..................... | 60/243 |
| 6,796,129 B2 | | 9/2004 | Yee et al. ................. | 60/777 |
| 6,912,856 B2 | * | 7/2005 | Morgan et al. ............ | 60/773 |
| 7,246,002 B2 | * | 7/2007 | Healy et al. ............... | 701/100 |
| 2006/0242963 A1 | * | 11/2006 | Casoni et al. ............. | 60/773 |

* cited by examiner

*Primary Examiner*—Louis J Casaregola
(74) *Attorney, Agent, or Firm*—Cantor Colburn LLP

(57) ABSTRACT

Disclosed herein is a method for controlling a bypass air split for a gas turbine combustor, the method comprising determining a target exhaust temperature, wherein the target exhaust temperature is based on at least one parameter of a group of parameters consisting of low pressure turbine speed, high pressure turbine speed, inlet guide vane angle, and bypass valve air split. Using the target exhaust temperature to calculate a required percentage of bypass air split based on maintaining maximum CO levels or minimum NOx levels. And, applying the required percentage of bypass air split to control a position of the bypass air valve.

9 Claims, 5 Drawing Sheets

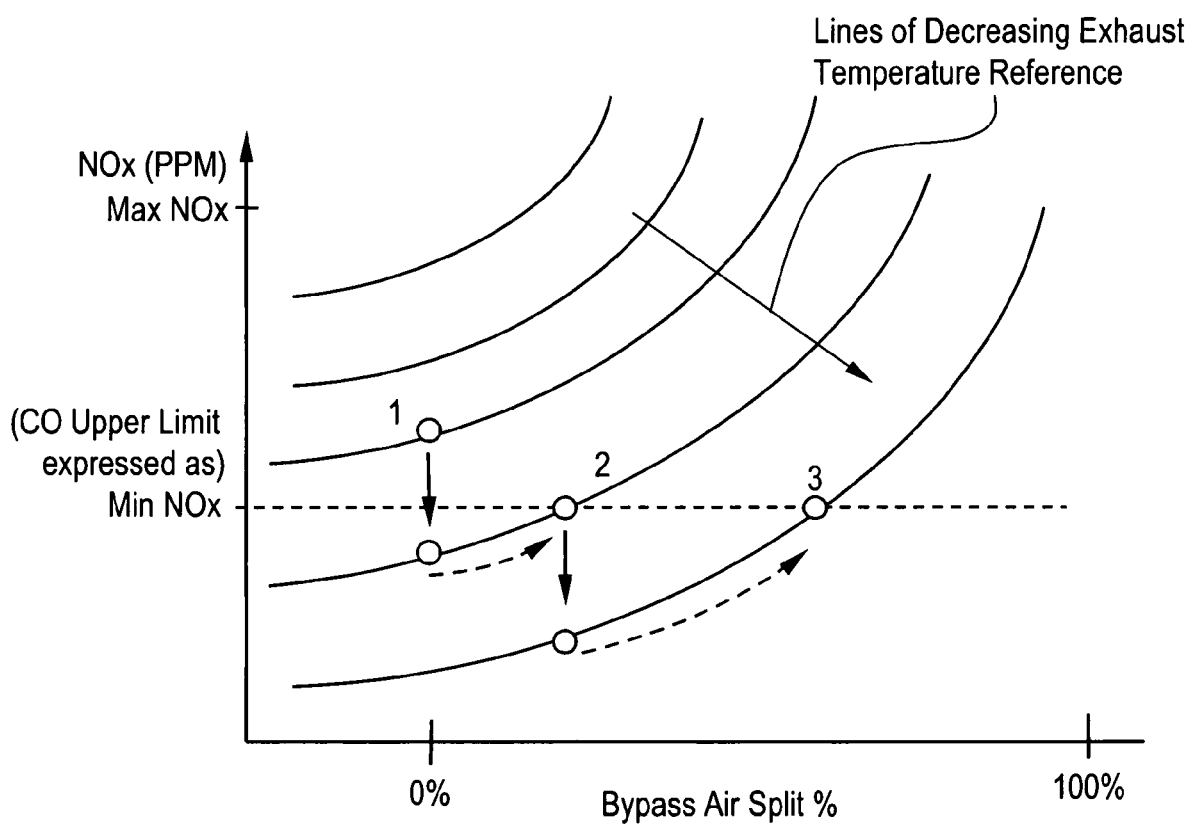

METHOD OF CONTROLLING BYPASS AIR SPLIT TO GAS TURBINE COMBUSTOR

TECHNICAL FIELD

This application relates generally to combustion system controllers for a two-shaft gas turbine. In particular, the invention relates to a combustor control algorithm for bypass air splits, carbon monoxide (CO) leveling, and nitrogen oxide/dioxide (NOx) leveling.

BACKGROUND OF THE INVENTION

Industrial and power generation gas turbines have control systems ("controllers") that monitor and control their operation. These controllers govern the combustion system of the gas turbine. Dry Low NOx (DLN) combustion systems are designed to minimize emissions of NOx from gas turbines. The controller executes an algorithm to ensure safe and efficient operation of the DLN combustion system. Conventional DLN algorithms receive as inputs measurements of the actual exhaust temperature of the turbine and the actual operating compressor pressure ratio. DLN combustion systems typically rely on the measured turbine exhaust temperature and compressor pressure ratio to set the gas turbine operating condition.

Conventional scheduling algorithms for DLN combustion systems do not generally take into account variations in compressor inlet pressure loss, turbine backpressure, compressor inlet humidity, low pressure turbine speed, high pressure turbine speed, and bypass valve air split. Conventional scheduling algorithms generally assume that ambient conditions, e.g., compressor inlet humidity, compressor inlet pressure loss, and turbine back pressure remain at certain defined constant conditions or that variations in these conditions do not significantly affect the target combustor firing temperature.

Compressor inlet pressure loss and turbine backpressure levels will vary from those used to define the DLN combustion settings. The NOx emissions and CO emissions from the gas turbine may increase beyond prescribed limits, if the conventional DLN combustion system is not adjusted as environmental conditions change. Seasonal variations in humidity or changes in turbine inlet humidity from various inlet conditioning devices, for example, evaporative cooler, fogging systems, can influence the operation of a DLN combustion system. As the ambient conditions change with the seasons, the settings of DLN combustion systems are often manually adjusted to account for ambient seasonal variations.

The Dry Low NOx (DLN) combustion system was modified for application on a two-shaft, compressor drive, single can, combustion gas turbine. The program required that the combustion system meet both CO and NOx emissions requirements at 50% turndown operation. A combustion bypass valve was designed into the DLN system to change the fuel to air ratio at the head end and thus flame temperature to meet the CO requirements at low loads. In the prior art, there existed no way to schedule the bypass valve air split to meet the CO emissions requirements.

A corrected parameter control approach was to be used to control the turbine operation. Exhaust temperature target adjustments were to be made based on specific humidity, compressor inlet pressure and compressor exhaust pressure. A two-shaft system added several more variables to the development of the exhaust temperature correction since its shaft speeds are not fixed. The addition of high pressure and low pressure turbine speeds, as well as second stage nozzle guide vanes and combustion bypass air increased the number of inputs into the algorithm and complicated the control. While turbine exhaust could be used to control high pressure turbine speed, low pressure turbine speed, and nozzle guide vanes, there existed no way to control the bypass air split.

BRIEF SUMMARY OF THE INVENTION

Disclosed herein is a method for controlling a bypass air split for a gas turbine combustor, the method comprising determining a target exhaust temperature, wherein the target exhaust temperature is based on at least one parameter of a group of parameters consisting of low pressure turbine speed, high pressure turbine speed, inlet guide vane angle, and bypass valve air split. Using the target exhaust temperature to calculate a required percentage of bypass air split based on maintaining maximum CO levels or minimum NOx levels. And, applying the required percentage of bypass air split to control a position of the bypass air valve.

Further disclosed herein is a method for determining a target exhaust temperature for a two-shaft gas turbine, the method comprising determining a target exhaust temperature based on a compressor pressure condition. Determining a temperature adjustment to the target exhaust temperature based on at least one parameter of a group of parameters consisting of low pressure turbine speed, high pressure turbine speed, inlet guide vane angle, and bypass valve air split. And, adjusting the target exhaust temperature by applying the temperature adjustment.

BRIEF DESCRIPTION OF THE DRAWINGS

Referring to the exemplary drawings wherein like elements are numbered alike in the accompanying Figures:

FIG. 5 is a graph of an exemplary bypass air split control for use in accordance with an embodiment of the invention.

DETAILED DESCRIPTION OF THE INVENTION

Figure 1:
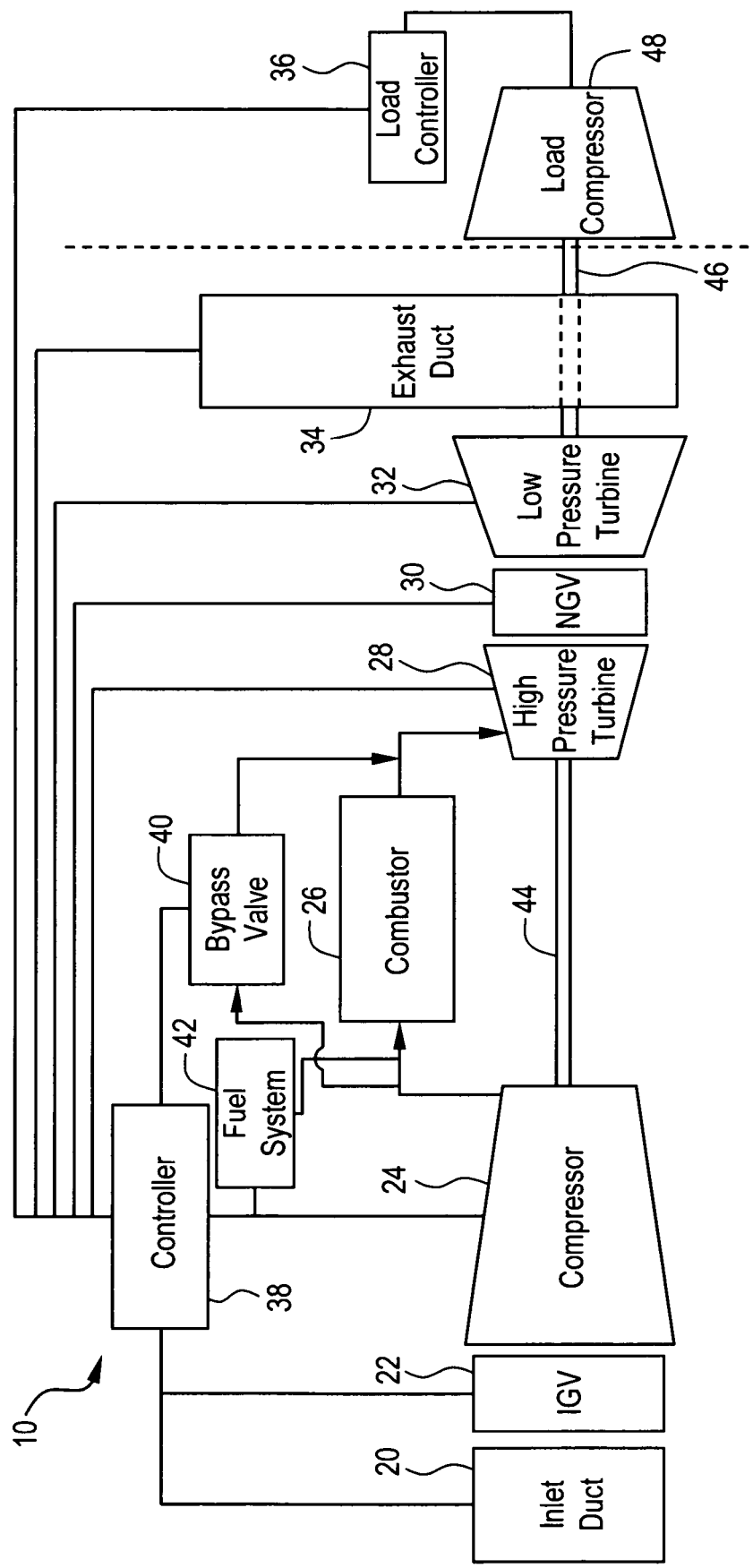
FIG. 1 is a schematic depiction of an exemplary two-shaft gas turbine having an air bypass valve for use in accordance with an embodiment of the invention.

FIG. 1 illustrates an exemplary configuration for a two-shaft gas turbine system 10 having a compressor 24, a combustor 26, a high pressure turbine 28 drivingly coupled, on a first shaft 44, to the compressor 24, a load compressor 48, a low pressure turbine 32 drivingly coupled, on a second shaft 46, to the load compressor 48, a load controller 36, and a gas turbine controller 38. An inlet duct 20 to the compressor 24 feeds ambient air to the compressor 24 through a stage of inlet guide vanes (IGV) 22. The flow path of air continues through the compressor 24 and into the combustor 26 towards fuel nozzles where it mixes with fuel 42 and is burned. Airflow can be redirected from going to the fuel nozzles through a bypass valve 40 where it is not mixed with the fuel and burned. The air redirected through the bypass valve 40 is discharged back into the main flow path towards the exit of the combustor 26.

The air continues through the high pressure turbine 28 to a stage of nozzle guide vanes (NGV) 30. The nozzle guide vanes direct high pressure turbine 28 exhaust air to the low pressure turbine 32. An exhaust duct 34 directs combustion gases from the outlet of the low pressure turbine 32 through ducts having, for example, emission control and sound absorbing devices. The exhaust duct 34 also applies a backpressure to the low pressure turbine 32. Unlike single-shaft gas turbine systems that run at a constant speed, the two-shaft gas turbine system operates at variable speeds. In other words, the compressor 24 and high pressure turbine 28 coupled to shaft 44 rotate at a different speed than the load compressor 48 and low pressure turbine 32 coupled to shaft 46.

A load controller 36 sends a speed demand to a gas turbine controller 38. The gas turbine controller 38 will then control low pressure turbine 32 speed using fuel flow and high pressure turbine 28 speed using nozzle guide vanes 30. The load on the low pressure turbine 32 and the load compressor 48 is adjusted by regulating fuel flow, through the fuel system 42, to the combustor 26.

The gas turbine controller 38 may be a computer system having a processor(s) that executes programs to control the operation of the gas turbine using system parameters, such as compressor 24 pressure ratio and exhaust back pressure, and instructions from human operators. The programs executed by the gas turbine controller 38 may include, for example, scheduling algorithms for regulating fuel and air flow to the combustor 26. The commands generated by the controller 38 cause actuators on the gas turbine to, for example, adjust valves between the fuel supply and combustor 26 that regulate the fuel flow, adjust valves to regulate airflow, or stroke command, to the combustor 26, adjust inlet guide vanes 22, and activate other control settings on the gas turbine.

The gas turbine controller 38 regulates the gas turbine based, in part, on algorithms stored in computer memory of the gas turbine controller 38. These algorithms enable the gas turbine controller 38 to maintain the NOx and CO emissions in the turbine exhaust to within certain predefined emission limits and to maintain the combustor firing temperature to within predefined temperature limits. The algorithms have inputs for parameter variables including compressor 24 pressure ratio, ambient specific humidity, inlet pressure loss, turbine exhaust back pressure, compressor 24 exit temperature, low pressure turbine 32 speed, high pressure turbine 28 speed, inlet guide vanes 22, and bypass valve 40 air split. Due to the parameters used as inputs by the algorithms, the gas turbine controller 38 accommodates seasonal variations in ambient temperature, ambient humidity, changes in the inlet pressure loss through the inlet duct 20 of the gas turbine and in the exhaust back pressure at the exhaust duct 34. An advantage of including parameters for ambient conditions and for inlet pressure loss and exhaust back pressure is that the NOx, CO and turbine firing algorithms enable the gas turbine controller to automatically compensate for seasonal variations in gas turbine operation. Accordingly, the need is reduced for an operator to manually adjust a gas turbine to account for seasonal variations in ambient conditions and for changes in the inlet pressure loss or turbine exhaust back pressure.

The combustor 26 may be, for example, a DLN combustion system. The gas turbine controller 38 may be programmed and modified to control the DLN combustion system. The DLN combustion control algorithms are set forth in FIGS. 2-5.

Figure 2:
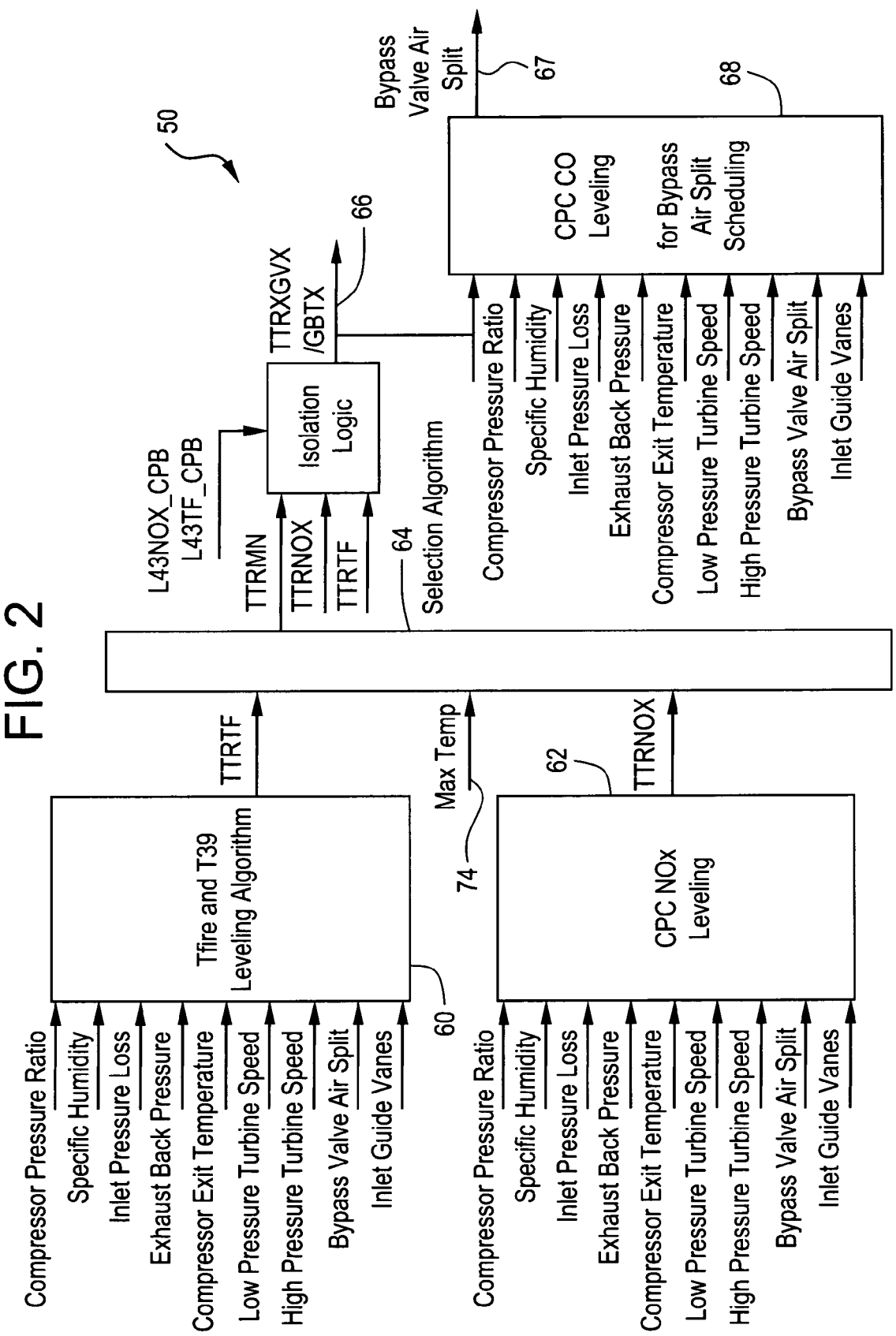
FIG. 2 is an exemplary block diagram of a system for selecting a desired turbine exhaust temperature and bypass air split schedule for use in accordance with an embodiment of the invention.

FIG. 2 is a block diagram of an exemplary process 50 for selecting a desired output target exhaust temperature 66 and a bypass air split schedule 67. The overall process 50 includes a selection algorithm 64 that selects a temperature target from a plurality of proposed exhaust temperatures by applying a certain logic, such as selection of the lowest temperature of the input temperature targets. These proposed exhaust temperature targets include: a desired exhaust temperature generated by a firing and combustor temperature leveling algorithm 60, a maximum exhaust temperature 74, and a desired exhaust temperature generated by a NOx leveling algorithm 62. The output target exhaust temperature 66 is compared by the gas turbine controller 38 to the actual turbine exhaust temperature. The difference between the desired and actual exhaust temperatures is applied by the controller to regulate the fuel flow and air flow to the combustor or the angle of the inlet guide vanes 22 (when operating part load).

The output target exhaust temperature 66 is also used as an input into the CO leveling algorithm 68 to calculate the required amount of bypass air to maintain NOx and CO within emission limits.

Figure 3:
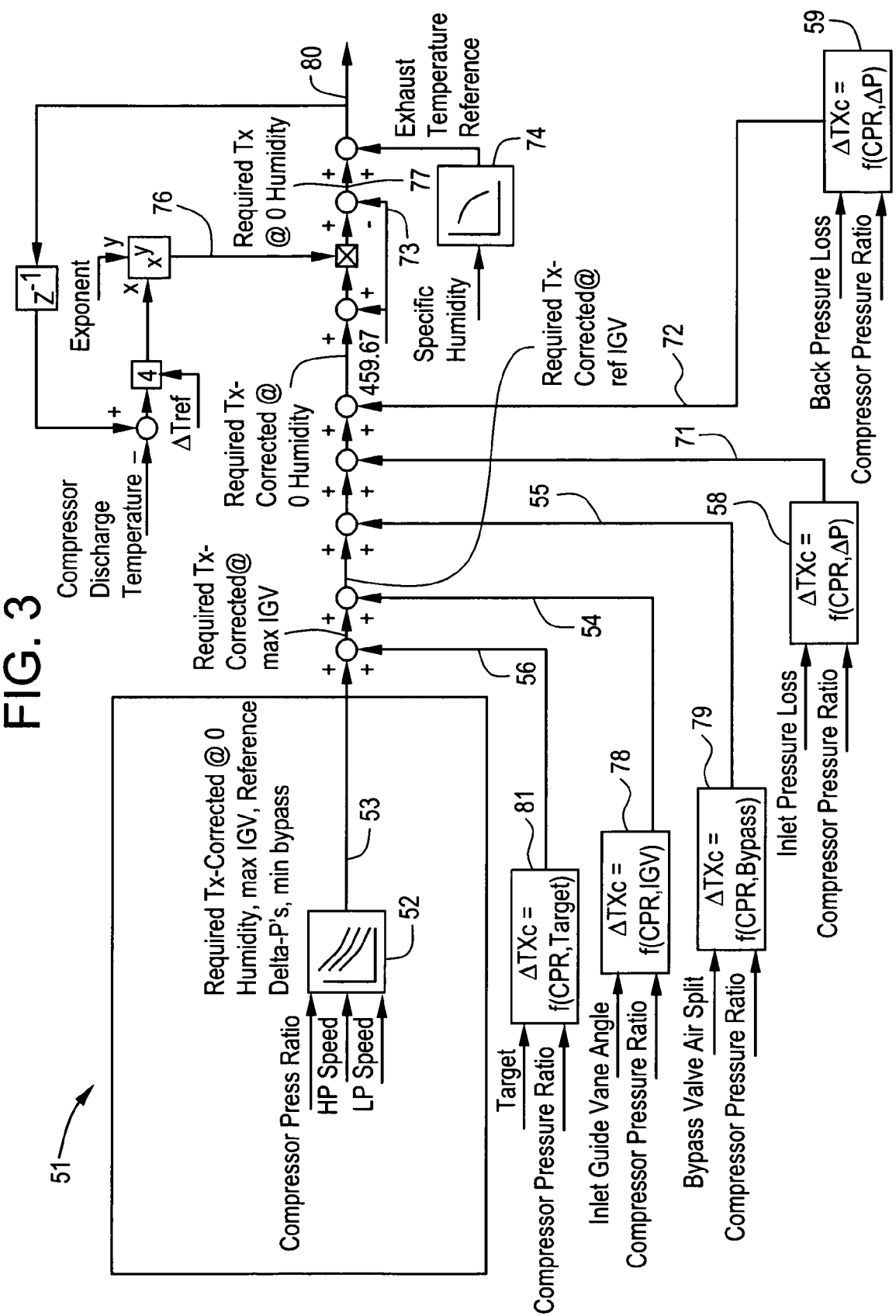
FIG. 3 is a diagram of an exemplary algorithm for calculating a desired exhaust temperature for use in accordance with an embodiment of the invention.

FIG. 3 is a block diagram of an exemplary algorithm 51 that is representative of each of the algorithms 60, 62 and 68 that produce a target exhaust temperature reference 80. The firing and combustor exit temperature leveling 60, NOx leveling 62, and CO leveling 68 algorithms each having their own unique schedules and correction factor exponent, but are otherwise similar and represented by algorithm 51. The algorithms receive input data including the compressor 24 pressure ratio, the specific humidity of the ambient air entering the compressor 24, the inlet duct pressure loss, exhaust back pressure, compressor 24 exit temperature, low pressure turbine 32 speed, high pressure turbine 28 speed, inlet guide vane 22 angle, and bypass valve 40 air split.

The representative algorithm 51 includes a transfer function 52 for applying the compressor 24 pressure ratio, high pressure turbine 28 speed, and low pressure turbine 32 speed to derive corrected turbine exhaust temperature 53. The transfer function 52 yields a corrected exhaust temperature that will result in a desired leveling objective for a defined reference load and ambient conditions.

The desired turbine exhaust temperature is influenced by the load on the gas turbine, ambient humidity, inlet guide vane 22 angle, bypass valve 40 air split, ambient temperature, and so forth. However, a schedule that itself takes into account the previously mentioned parameters would be complex and difficult to apply in a controller. The corrected exhaust temperature transfer function 52 may be simplified by assuming that the load, ambient temperature, inlet guide vane 22 angle, bypass valve 40 air split, and ambient humidity are each at a defined condition. By defining certain conditions, the transfer function 52 is reduced to having three input variables, which are the compressor 24 pressure ratio, high pressure turbine 28 speed, and low pressure turbine 32 speed. A low pressure turbine 32 speed set point is defined by the compressor load controller 36.

To derive the desired actual exhaust temperature, the corrected exhaust temperature is adjusted to account for the load, inlet guide vane 22 angle, bypass valve 40 air split, ambient temperature, and ambient humidity. The corrected exhaust temperature 53 is first adjusted to account for changes in a gas turbine system 10 target. For example, if the NOx upper boundary were to increase, a new algorithm target would be updated as an input into a target schedule 81. The new target would bias the corrected exhaust temperature reference from the transfer function 52 by a delta corrected exhaust temperature. The target schedule 81 may be provided as a tuning method for the algorithm 51 to better fit individual gas turbine systems.

The corrected exhaust temperature 53 is then adjusted to account for the actual inlet guide vane 22 angle and the bypass valve 40 air split. Followed by adjustments to account for compressor 24 inlet pressure loss and exhaust back pressure. The next step in algorithm 51 is to "uncorrect" the adjusted corrected exhaust temperature to an absolute temperature level, such as degrees Rankine in step 73. The absolute temperature is multiplied (step 73) by a correction factor 76, which is a function (xy) of a correction factor exponent (y) and a compressor 24 temperature ratio (x). The correction factor exponent (y) may be empirically derived, and may be specific to each algorithm 60, 62, and 68 and each class of gas turbine. The compressor 24 temperature ratio (x) is an indication of gas turbine load. The factor x is a function defined by the compressor 24 temperature ratio which is the current exhaust temperature minus the compressor 24 discharge temperature over a reference exhaust temperature minus the compressor 24 discharge temperature (delta Tref). By multiplying the function (xy) and the corrected target exhaust temperature, an uncorrected target exhaust temperature 77, converted to a non-absolute temperature scale, is generated.

The corrected turbine exhaust temperature 53 outputted from the transfer function 52 does not account for deviations in the compressor 24 inlet pressure loss, exhaust back pressure, changes in ambient humidity, high pressure turbine 28 speed, inlet guide vane 22 angle, or bypass valve 40 air split. Additional schedules 58, 59, 74, 78, 79, and 81 are applied to adjust the target turbine exhaust temperature for changes in these conditions.

The inlet guide vane 22 angle schedule 78 may be a function that correlates a delta exhaust temperature to the actual compressor 24 pressure ratio and the inlet guide vane 22 angle. For a first application the inlet guide vane 22 angle varies only during a small portion of the application while at a fixed high pressure turbine 28 speed. A delta exhaust temperature value 54 output from the inlet guide vane 22 angle schedule 54 is a corrected temperature value. Accordingly, the delta exhaust temperature value 54 is summed with the target corrected exhaust temperature 53 derived from the transfer function 52. When the inlet guide vane 22 angle is at a predefined positioned, which may be open for example, the delta exhaust temperature 54 is zero.

Similarly, the bypass valve 40 air split schedule 79 produces a corrected delta exhaust temperature adjustment 55 to be summed with the corrected exhaust temperature 53. In the case that the bypass valve 40 is at a minimum setting, the delta exhaust temperature adjustment 55 is zero.

The inlet pressure loss schedule 58 may be a function that correlates a delta exhaust temperature to the actual compressor 24 pressure ratio and the compressor 24 inlet pressure loss. The pressure loss is a function of corrected flow through the gas turbine and varies with the load on the gas turbine and therefore the inlet pressure loss schedule 58 is a function of compressor 24 pressure ratio. The delta exhaust temperature value 71 output from the inlet pressure loss schedule 58 is a corrected temperature value. Accordingly, the delta exhaust temperature value 71 is summed with the target corrected exhaust temperature 53 derived from the transfer function 52.

Similarly, the back pressure schedule 59 produces a delta value for the corrected exhaust temperature 53 based on a function of the compressor 24 pressure ratio and the actual back pressure. The turbine back pressure loss is a function of corrected flow through the gas turbine and varies with the load on the gas turbine and therefore the back pressure schedule 59 is a function of compressor 24 pressure ratio. The back pressure delta value 72 is summed with the target corrected exhaust temperature value 53.

The humidity schedule 74 applies a delta exhaust temperature versus a delta specific humidity. The delta specific humidity is the difference in the actual ambient humidity from a pre-defined level of humidity. The delta exhaust temperature is applied to the uncorrected target exhaust temperature. The schedule 74 is applied to determine the temperature difference to be used to adjust the corrected exhaust temperature. The temperature difference may be a positive or negative value.

Figure 4:
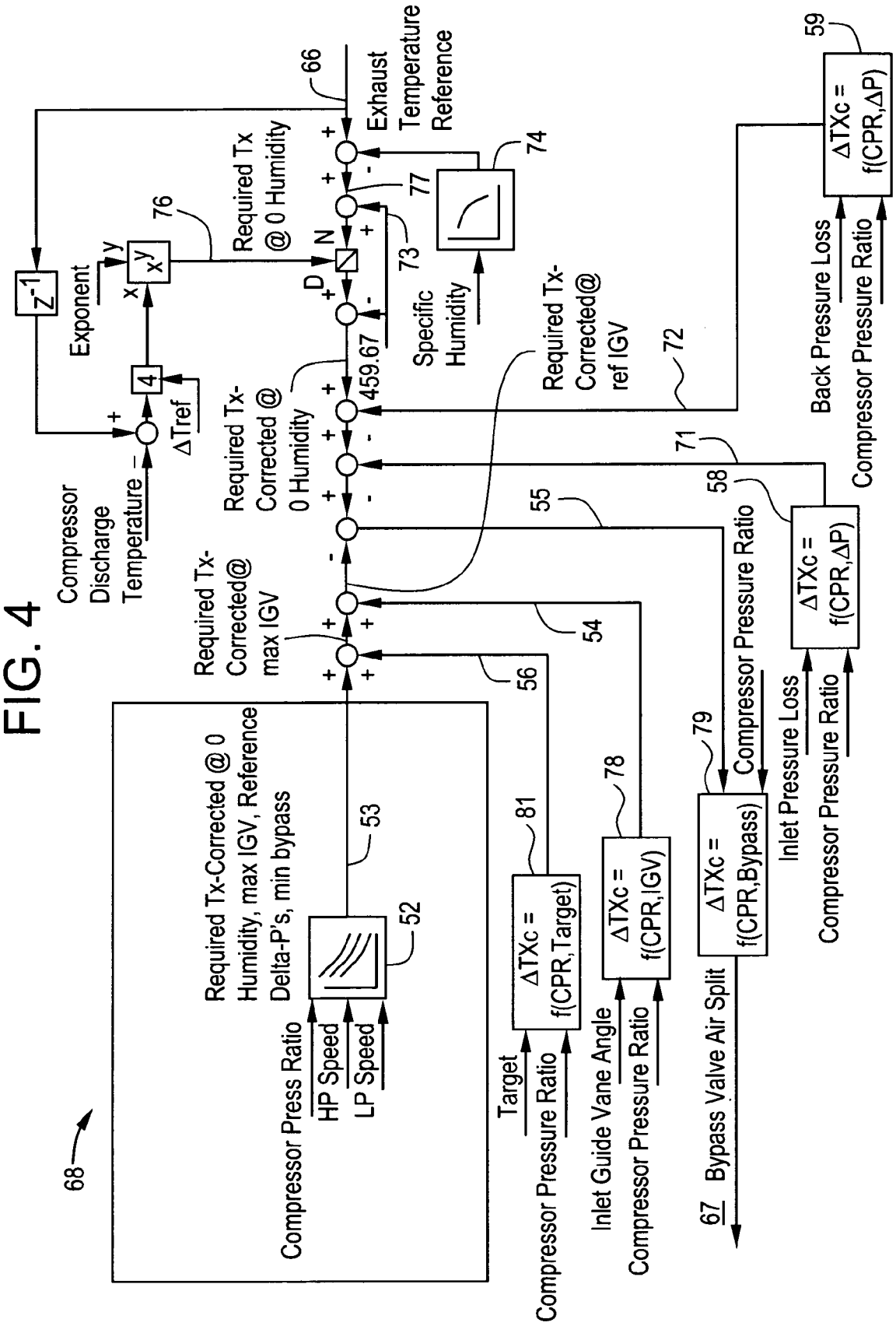
FIG. 4 is a diagram of an exemplary CO leveling algorithm for bypass air split scheduling for use in accordance with an embodiment of the invention.

FIG. 4 is a block diagram of an exemplary CO leveling algorithm 68 for bypass air split scheduling. The CO Leveling algorithm 68 is nearly the same as the exemplary algorithm 51, containing the same inputs as that of algorithms 60 and 62, but uses the selected target exhaust temperature 66 as an input and calculates a new bypass air split control 67 to provide a bypass valve 40 position.

In the CO Leveling Algorithm 68, the CO upper limit is correlated to a minimum NOx boundary. This can be done since CO and NOx emissions have an inverse relationship. Large amounts of CO are generated at low temperatures and NOx at high temperatures. Thus when CO begins to encroach on its upper boundary, NOx is running very low. While the same functionality can be achieved, and in some cases must be achieved, using CO transfer functions, NOx transfer functions are more stable than CO transfer functions and thus are more desirable.

FIG. 5 illustrates an exemplary bypass air split control 67 during gas turbine operation in response to the bypass valve 40 air split schedule 79 which prescribes the operation of the bypass valve 40. Point 1 depicts the bypass split control 67 as fully closed due to CO being below its maximum allowable value (expressed as a NOx lower limit). In the absence of a CO limit violation, the preferred position of the bypass valve 40 is at a minimum position. Bypass air split control 67 from point 1 to point 2 represents a transient operation in the gas turbine where the exhaust temperature reference decreases. This moves the emissions above the maximum allowable CO emissions, and therefore this causes the bypass valve 40 to open in order to bring CO back down to maximum allowable limit. Bypass air split control 67 from point 2 to point 3 represents a second transient in the gas turbine which causes another decrease in the exhaust temperature reference, therefore the bypass valve 40 opens further to maintain CO at the maximum allowable limit. Thus the bypass valve 40 would continue to open (up to 100% split) as the exhaust temperature decreases to maintain the minimum NOx boundary. Inversely, the bypass valve 40 would continue to close as exhaust temperature increases to maintain the minimum NOx boundary.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method for controlling a bypass air split for a gas turbine combustor comprising:
   determining a target exhaust temperature, wherein the target exhaust temperature is based on at least one parameter of a group of parameters consisting of low pressure turbine speed, high pressure turbine speed, inlet guide vane angle, and bypass valve air split;

using the target exhaust temperature to calculate a required percentage of bypass air split based on maintaining maximum CO levels or minimum NOx levels; and, applying the required percentage of bypass air split to control a position of the bypass air valve.

2. A method as in claim 1 wherein the target exhaust temperature is further based on at least one parameter of a group of parameters consisting of compressor pressure ratio, specific humidity, compressor inlet pressure loss, turbine exhaust back pressure, and compressor exit temperature.

3. A method as in claim 2 wherein the compressor pressure ratio provides a correction to the target exhaust temperature based on a plurality curves.

4. A method as in claim 1 wherein the determining a target exhaust temperature, using the target exhaust temperature to calculate a required percentage of bypass air split, and applying the required percentage of bypass air split to control a position of the bypass air valve are repeated periodically during operation of the gas turbine.

5. A method as in claim 1 wherein absent a CO limit violation, the preferred position of the bypass valve is at a minimum setting.

6. A method as in claim 1 wherein the CO levels are correlated to at least one group of parameters including compressor discharge temperature, combustor exit temperature, turbine inlet temperature, compressor discharge pressure, and minimum NOx boundary.

7. A method for determining a target exhaust temperature for a two-shaft gas turbine comprising:

determining a target exhaust temperature based on a compressor pressure condition;

determining a temperature adjustment to the target exhaust temperature based on at least one parameter of a group of parameters consisting of low pressure turbine speed, high pressure turbine speed, inlet guide vane angle, and bypass valve air split; and, adjusting the target exhaust temperature by applying the temperature adjustment;

wherein the determining a target exhaust temperature, determining a temperature adjustment, and adjusting the target exhaust temperature are repeated periodically during the operation of the two-shaft gas turbine.

8. A method as in claim 7 wherein the target exhaust temperature is further based on at least one parameter of a group of parameters consisting of compressor pressure ratio, specific humidity, compressor inlet pressure loss, turbine exhaust back pressure, and compressor exit temperature.

9. A method as in claim 7 further comprising generate a plurality of the target exhaust temperatures, and selecting one of the plurality of target exhaust temperatures to be applied to control the two-shaft gas turbine.

* * * * *